United States Patent

Anderton

Patent Number: 5,451,666
Date of Patent: Sep. 19, 1995

[54] REACTIVE DYES HAVING A TRIAZINE GROUP WHICH IS SUBSTITUTED BY HYDROGEN OR AN ALKYL GROUP

[75] Inventor: Kenneth Anderton, Bury, England

[73] Assignee: Zeneca Limited, London, England

[21] Appl. No.: 73,513

[22] Filed: Jun. 9, 1993

[30] Foreign Application Priority Data

Jun. 12, 1992 [GB] United Kingdom ............. 9212472

[51] Int. Cl.$^6$ ............... C09B 62/503; D06P 1/384
[52] U.S. Cl. ............................. 534/618; 534/617; 534/642; 534/612; 534/634; 540/126; 544/76; 544/189; 544/205; 544/206; 544/207
[58] Field of Search ............... 534/642, 618; 544/76, 544/189, 205–207; 540/126

[56] References Cited

U.S. PATENT DOCUMENTS 5,280,110  1/1994  Dannheim et al. ............. 534/642 X

FOREIGN PATENT DOCUMENTS

| 233139 | 8/1987 | European Pat. Off. . |
| 425907 | 5/1991 | European Pat. Off. . |
| 548792 | 6/1993 | European Pat. Off. . |
| 59-96174 | 6/1984 | Japan ........................... 534/638 |
| 884802 | 12/1961 | United Kingdom . |
| 902121 | 7/1962 | United Kingdom . |

OTHER PUBLICATIONS

Venkataraman, K., "The Chemistry of Synthetic Dyes", vol. I, Academic Press, New York, 1952, pp. 461–463.
Chemical Abstracts, vol. 102, 1985—Formula Index, Part 2, 2583F $C_{28}H_{25}N_7O_{14}S_4$.
Chemical Abstracts, vol. 110, 1989—Formula Index, Part 3, 3767F, $C_{39}H_{33}N_9O_{23}S_7$.

*Primary Examiner*—Robert Gerstl
*Assistant Examiner*—Fiona T. Powers
*Attorney, Agent, or Firm*—Cushman Darby & Cushman

[57] ABSTRACT

A water-soluble dye having a reactive group of the Formula (1):

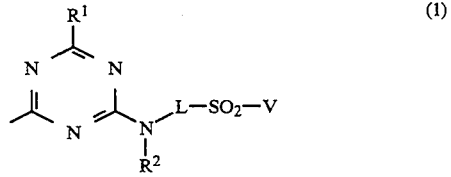

wherein:
$R^1$ is H or optionally substituted alkyl;
$R^2$ is H or $C_{1-4}$-alkyl;
L is a divalent organic spacer group; and
V is vinyl or a group convertible to vinyl on treatment with aqueous alkali.

The reactive dyes of the present invention are useful for coloring natural and artificial textile materials containing amino or hydroxyl groups.

16 Claims, No Drawings

REACTIVE DYES HAVING A TRIAZINE GROUP WHICH IS SUBSTITUTED BY HYDROGEN OR AN ALKYL GROUP

This invention relates to reactive dyes and more particularly to water-soluble reactive dyes of the azo, anthraquinone, formazan, triphenodioxazine and phthalocyanine series, to a process for their preparation, to a process for the coloration of materials having amino or hydroxyl groups and to such materials when coloured by the dyes.

According to the invention there is provided a water-soluble dye having a reactive group of the Formula (1):

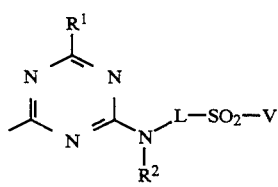

(1)

wherein:
$R^1$ is H or optionally substituted alkyl;
$R^2$ is H or $C_{1-4}$-alkyl;
L is a divalent organic spacer group; and
V is vinyl or a group convertible to vinyl on treatment with aqueous alkali.

$R^1$ is preferably H or $C_{1-4}$-alkyl, more preferably H or methyl, especially H.

$R^2$ is preferably H or methyl.

L is preferably an alkylene, arylene or aralkylene group.

Preferred alkylene groups contain up to 8 carbon atoms, especially preferred alkylene groups are of the formula $—(CH_2)_m—$, $—(CH_2)_m—O—(CH_2)_p—$ or $—(CH_2)_m—NR^3—(CH_2)_p—$ wherein m and p each independently have a value of from 2 to 4 and $R^3$ is H or $C_{1-4}$-alkyl. Preferred arylene groups are phenylene and sulphophenylene, especially 1,3-phenylene and 1,4-phenylene. Preferred aralkylene groups are benzylene ($—C_6H_4.CH_2—$) and xylylene ($—CH_2.C_6H_4.CH_2—$).

A preferred dye according to the invention is a water-soluble reactive dye of the Formula (2):

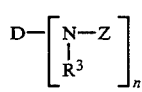

(2)

wherein:
each
  Z independently is of Formula (1) as hereinbefore defined; D is a chromophoric group;
each
  $R^3$ independently is H or optionally substituted alkyl; and
  n is 1 or 2.

$R^3$ is preferably H or $C_{1-4}$-alkyl, especially H or methyl.

D can be any chromophoric group, but is preferably of the azo, (for example azo pyridone), triphenodioxazine, anthraquinone, phthalocyanine or formazan series, more preferably of the triphenodioxazine series, and it is particularly preferred that D is a chromophoric group of the azo series. When D is a chromophoric group of the azo series it is preferably a mono- or disazo chromophoric group.

D preferably has one or more, and especially from 1 to 6, water solubilising groups, for example carboxy or preferably sulpho.

The group represented by D may include a further cellulose-reactive group in addition to the group or groups represented by $—NR^3Z$. The further cellulose-reactive group can be any of known cellulose reactive groups, preferably of the pyrimidinyl amino, or more preferably of the triazinylamino or vinyl sulphone series.

The preferred pyrimidinylamino cellulose-reactive groups are trichloropyrimidinylamino, and especially difluorochloropyrimidinylamino groups.

The preferred triazinylamino cellulose-reactive groups are of the formula:

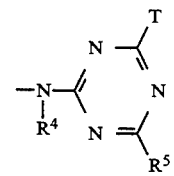

wherein T is a labile atom or group; $R^5$ is T (as hereinbefore defined), alkoxy, especially $C_{1-4}$-alkoxy; amino; or anilinyl which is optionally substituted by a sulpho and/or carboxy group; and $R^4$ is H or $C_{1-4}$-alkyl.

By a labile atom or group, it is meant an atom or group which is bound by a chemical bond to the triazine nucleus, which atom or group is readily replaced by a hydroxyl group under mildly alkaline aqueous conditions. As examples of such atoms or groups, there may be mentioned halogen atoms such as F and Cl; sulphonic acid groups; thiocyano groups; quaternary ammonium groups such as trialkylammonium groups; and optionally substituted pyridinium groups such as 3- or 4-carboxypyridinium groups. It is preferred that T is halo, especially fluoro or chloro; or 3- or 4-carboxypyridinium.

Reactive groups of the vinyl sulphone series are of formula $—SO_2—V$ wherein V is as hereinbefore defined. Examples of groups convertible to vinyl in the presence of aqueous alkali include $—CH_2CH_2OSO_3H$ and $—CH_2CH_2SSO_3H$.

A dye according to the invention may be prepared by a process comprising the condensation of a dye having a group of Formula (3) with an amine of Formula (4), wherein $R^1$, $R^2$ L and V are as hereinbefore defined and X is a halogen atom, especially chloro:

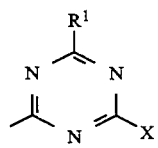

(3)

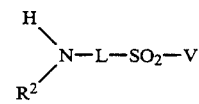

(4)

If desired the halogen atom X may subsequently be replaced by an alternative desired labile atom or group represented by using conventional chemistry, for example heating with a quaternary ammonium compound or an optionally substituted pyridine compound.

The above processes may conveniently be carried out in an aqueous medium, preferably in the presence of an acid-binding agent. The function of the acid-binding agent is to neutralise the hydrogen halide as it is formed during the reaction. Accordingly any acid-binding agent may be used provided that it is not present in such a concentration that it causes hydrolysis of the reactants or causes some other side-reaction. It is preferred to use an alkali metal carbonate or bicarbonate, added at such a rate that the pH of the mixture stays within the range of 6 to 8. The temperature of the condensation may be between 0° C. and 100° C. dependent on the ease with which the reaction occurs, preferably between 0° C. and 60° C., especially between 0° C. and 20° C.

As will be appreciated, more or less than one molecular proportion of a compound of Formula (4) can be used in the above process (e.g. 0.5–1.5 and especially 0.9–1.1 molecular proportions), but this is less preferred since it is wasteful of whichever compound is in excess.

The compounds of Formula (3) can be prepared by condensation of a 2,4-dihalogeno-1,3,5-triazine having a group defined by $R^1$ at the 6-position with a dye having a nucleophilic group, for example a hydroxy or especially an amino group, preferably in the presence of an acid-binding agent.

As examples of preferred compounds of Formula (1) there may be mentioned compounds of the following classes, without however limiting the invention to the classes specifically described.

Class 1

Monoazo compounds of the Formula (5):

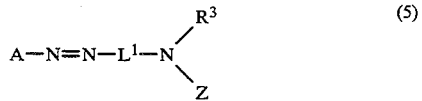

wherein:
A is an optionally substituted mono- or di-cyclic aryl radical;
$L^1$ is an optionally substituted mono- or di-cyclic arylene radical; and
Z and $R^3$ are as hereinbefore defined.

A is preferably an optionally substituted phenyl or naphthyl group. When A is substituted the substituents or substituent is preferably cellulose-reactive, for example $-SO_2-V$ wherein V is as hereinbefore defined, one of the above mentioned pyrimidinylamino or triazinylamino cellulose-reactive groups, or a group of formula $-NR^3Z$ wherein $R^3$ and Z are as hereinbefore defined; or a halogen atom, especially chlorine; an alkyl radical, especially $C_{1-4}$-alkyl, more especially methyl; an acylamino radical, especially acetylamino, benzamido or sulphonated benzamido; ureido; amino; hydroxy; or an alkoxy radical, especially $C_{1-4}$-alkoxy, more especially methoxy.

The preferred divalent mono- or dicyclic arylene radical represented by $L^1$ is an optionally substituted phenylene or naphthylene group. Preferred optional substituents are selected from those mentioned above for A.

A preferred optionally substituted naphthylene group represented by $L^1$ is of the Formula (6):

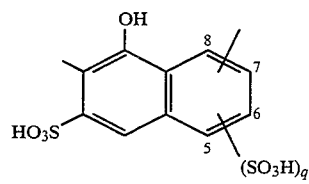

wherein:
q is 0 or 1; and the group represented by $-NR^3Z$ in Formula (5) is attached to the 5-, 6-, 7- or 8-position.

When $L^1$ is an optionally substituted naphthylene group as shown above $-NR^3Z$ is preferably at the 6-, 7- or 8-position, especially the 6- or 8-position. When $-NR^3Z$ is at the 8-position it is preferred that q is 1 and the sulpho group is at the 6-position.

Class 2

Disazo compounds of Formula (7):

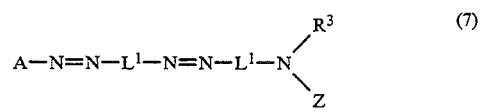

wherein:
each $L^1$ independently is as hereinbefore defined; and
A, $R^3$ and Z are as hereinbefore defined.

Class 3

Azo compounds of the Formula (8):

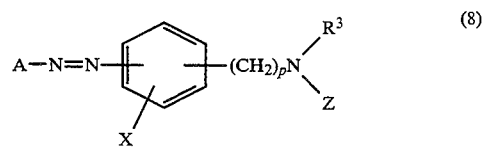

wherein:
p is 0 or 1;
X is halogeno, preferably chloro; alkyl, especially $C_{1-4}$-alkyl; alkoxy, especially $C_{1-4}$-alkoxy; carboxy; sulpho; ureido; or acylamino such as acetamido; and
A, Z and $R^3$ are as hereinbefore defined.

It is preferred that when p is 1, A is a coupling component. Suitable coupling components will be apparent to dye chemists, and comprise compounds which are capable of reacting with a diazo component. Examples of preferred coupling components are J-Acid, H-Acid, Gamma-Acid, 2R-Acid and the like. It is particularly preferred that X is sulpho or ureido. When p is 0 the group $-NR^3Z$ is preferably para to the azo group $A-N=N-$.

Class 4

The metal complex, e.g. the copper, chromium and cobalt complex, compounds of those dyes of Classes 1, 2 and 3 which contain one or preferably two metallisable (for example, a hydroxyl, methoxy, ethoxy or carboxylic acid) group ortho to an azo group.

Class 5

Anthraquinone compounds of the Formula (9):

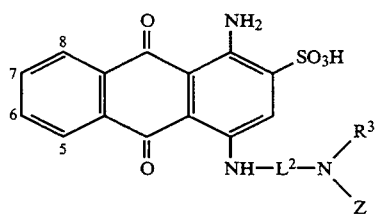

(9)

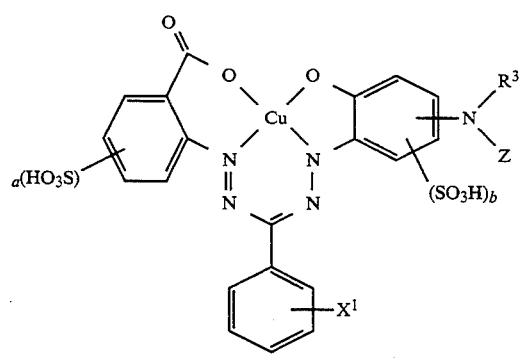

(12)

wherein the anthraquinone nucleus optionally contains a sulphonic acid group in one or more of the 5-, 6-, 7-and 8-positions; Z and $R^3$ are as hereinbefore defined; and $L^2$ is a divalent organic linking group as hereinbefore defined for L, preferably a radical of the benzene series, for example a phenylene, diphenylene, 4,4'-divalent stilbene or azobenzene radical which is optionally sulphonated.

Class 6

Phthalocyanine compounds of the Formula (10):

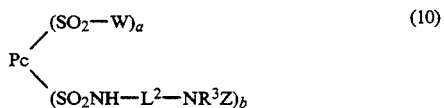

(10)

wherein Z and $R^3$ are as hereinbefore defined: Pc is a metallophthalocyanine nucleus, preferably copper or nickel phthalocyanine; each W independently is a hydroxy or a substituted or unsubstituted amino group; $L^2$ is a divalent organic linking group as hereinbefore defined, preferably $C_{1-4}$-alkylene, phenylene or sulphophenylene; and a and b are each independently 1, 2 or 3 provided that a+b is not greater than 4.

Class 7

Triphenodioxazine compounds of the Formula (11):

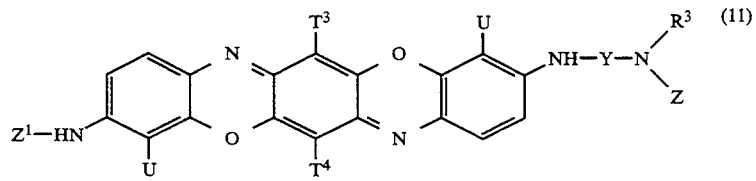

(11)

wherein:

$Z^1$ is H or a group of formula

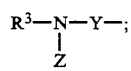

Z and $R^3$ are each independently as hereinbefore defined; each Y independently is $C_{2-4}$-alkylene, phenylene or sulphophenylene; U is H or $SO_3H$; and $T^3$ and $T^4$ are halo, especially chloro, or $C_{1-4}$-alkyl.

It is preferred that $R^3$ is H or $C_{1-4}$-alkyl, especially H. Each Y is preferably —$C_2H_4$— or —$C_3H_6$—. U is preferably $SO_3H$. $T^3$ and $T^4$ are preferably Cl or methyl.

Class 8

Formazan compounds of the Formula (12):

wherein:

Z and $R^1$ are as hereinbefore defined:

$X^1$ is H, $SO_3H$ or Cl and a and b each independently have a value of 0, 1 or 2; provided that the dye has at least one, and preferably at least two, sulpho groups.

It is preferred that a and b each have a value of 1.

Although dye formulae have been shown in the form of their free acid in this specification, the invention also relates to the dyes in the salt form, particularly their salts with alkali metals such as the sodium, lithium or mixed sodium/lithium salt and optionally substituted ammonium salts. The term aryl as used in this specification includes heteroaryl.

A further feature of the present invention provides a composition comprising an inert carrier and a dye according to the invention, preferably in a weight ratio of 1:99 to 99:1, more preferably 50:1 to 1:50, especially 20:1 to 1:20. The inert carrier preferably comprises inorganic salts and optionally a de-dusting agent. Examples of inorganic salts include alkali and alkaline earth metal halides, carbonates, bicarbonates, nitrates and mixtures thereof. Dodecylbenzene may be used as de-dusting agent.

The reactive dyes of the present invention are suitable for colouring natural and artificial textile materials containing amino or hydroxyl groups, for example textile materials such as wool, silk and cellulosic materials. The textile materials are coloured bright shades and possess good fastness to light and to wet treatments such as washing and also have good wash off properties. The dyes are found to have good solubility in water. Preferred dyes are free from halogen atoms because these are more environmentally friendly than dyes which contain halogens.

Further features of the invention comprises a process for the coloration of a textile material, especially a cellulosic textile material, comprising applying thereto a dye according to the invention and textile materials coloured using the dyes. For this purpose the dyes are preferably applied to the cellulosic textile material in conjunction with a treatment with an acid-binding agent, for example, sodium bicarbonate, sodium carbonate, sodium metasilicate, trisodium phosphate or sodium hydroxide, which may be applied to the cellulose textile material before, during or after the application of the dye.

The new dyes can be applied to textile materials containing amino groups, such as wool and polyamide textile materials, from a mildly alkaline, neutral or acid dyebath. The dyebath may contain substances which are commonly used in the dyeing of textile materials containing amino groups, for example ammonium acetate, sodium sulphate, ethyl tartrate, non-ionic dispersing agents such as condensates of ethylene oxide with amines, fatty alcohols or phenols, surface-active cationic agents such as quaternary asonium salts for example cetyl trimethylammonium bromide and cetyl pyridinium bromide and organic liquids such as n-butanol and benzyl alcohol.

The invention is illustrated but not limited by the following Examples in which all parts and percentages are by weight unless stated otherwise.

EXAMPLE 1

Preparation of a compound of the formula

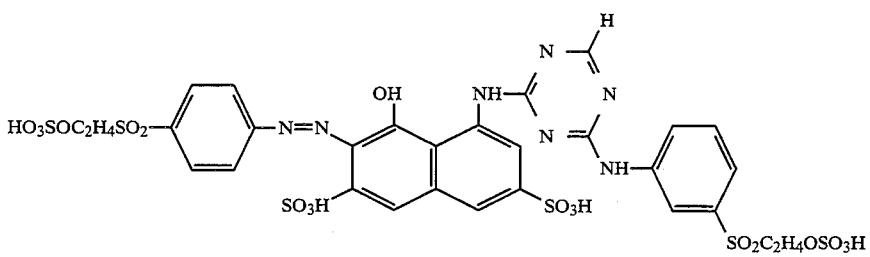

2N Sodium carbonate was added to a stirred suspension of 1-amino-8-hydroxynaphthalene-3,6-disulphonic acid (319 parts) in water (1000 parts) until a complete solution of approximately pH 6.0 was obtained. This solution was added dropwise to a stirred suspension obtained by gradual addition of a solution of 2,4-dichloro-s-triazine (161 parts) in acetone (800 parts by volume) to ice-water (1000 parts) at 0°–5° C., the pH of the solution being allowed to fall to 3 and then maintained at this value by addition of 2N sodium carbonate. The resultant mixture was stirred for a further 1 hour at 0°–5° C. and pH 3 to give a coupling component solution.

To a stirred mixture of 4-aminophenyl-$\beta$-sulphatoethylsulphone (309 parts) in ice-water (2000 parts) at 0°–5° C. was added aqueous hydrochloric acid (34.5% strength, 568 parts by volume) followed by 2N sodium nitrite (568 parts by volume). The mixture was stirred for 30 minutes at 0°–5° C. before destroying excess nitrous acid by addition of sulphamic acid. The resultant diazonium salt suspension was added to the above coupling component solution, the pH raised to 6 by addition of sodium carbonate, and the mixture stirred for a further 2 hours at 0°–5° C. The azo product was precipitated by salting with potassium chloride, isolated by filtration and dried to give a dry azo product.

The dry azo product (497 parts) and 3-aminophenyl-$\beta$-sulphatoethylsulphone (221 parts) were condensed by stirring in water (3000 parts) at 40° C. for 18 hours, during which the pH was maintained at 6 by addition of 2N sodium carbonate as required. The product was isolated from the resultant mixture by salting with potassium chloride and the precipitate filtered off and dried to give the alkali metal salt of the title compound (lambda$_{max}$ 523 nm), 262 parts at 54% strength calculated as free sulphonic acid.

EXAMPLE 2

Preparation of the compound of the formula

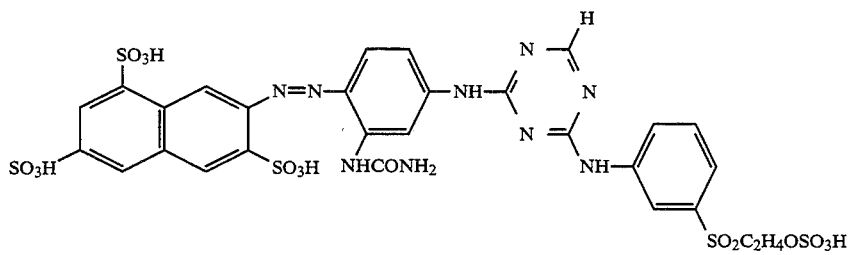

To a stirred solution of 7-aminonaphthalene-1,2,6-trisulphonic acid (383 parts) in ice-water (1000 parts) at 0°–5° C. was added aqueous hydrochloric acid (34.5% strength, 550 parts by volume) followed by 2N sodium nitrite (550 parts by volume). The mixture was stirred for 30 minutes at 0°–5° C. before destroying excess nitrous acid by addition of sulphamic acid. To the resultant diazonium salt suspension was added a solution of 3-ureidoanilinehydrochloride (169 parts) in water (1000 parts) at 0°–5° C., the pH raised to 6–7 by addition of sodium carbonate, and the mixture stirred at 0°–5° C. for a further hour. The resultant azo dyebase was precipitated by salting with potassium chloride, isolated by filtration and dried.

To a stirred solution of the above dry azo dyebase (195 parts) in water (800 parts) at 0°–5° C. was added a solution of 2,4-dichloro-s-triazine (98 parts) in acetone (400 parts by volume). The mixture was stirred at 0°–5° C. for 1 hour and the pH maintained at 6–7 by addition of 2N sodium carbonate as required. The precipitated monochloro triazinyl product was isolated by filtration and dried.

The above dry monochlorotriazinyl product (189 parts) and 3-aminophenyl-$\beta$-sulphatoethylsulphone (115 parts) were condensed by stirring in water (1200 parts) at 45° C. for 18 hours, during which the pH was maintained at 6.5 to 7 by addition of 2N sodium carbonate as required. The resultant mixture was cooled to ambient temperature and the product precipitated by dropwise addition of acetone, isolated by filtration and dried to give the alkali metal salt of the title compound (lambda$_{max}$ 422 nm).

The title product was applied to cotton by exhaust dyeing.

EXAMPLE 3

Preparation of a compound of the formula

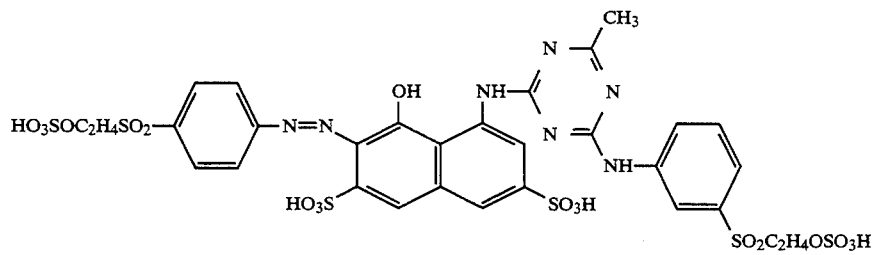

The method of Example 1 was repeated except that in place of 2,4-dichloro-s-triazine (161 parts) there was used 2,4-dichloro-6-methyl-s-triazine (176 parts) to give the alkali metal salt of the title compound (lambda max 527 nm).

The title product was applied to cotton by exhaust dyeing.

EXAMPLE 4

Preparation of the compound of the formula

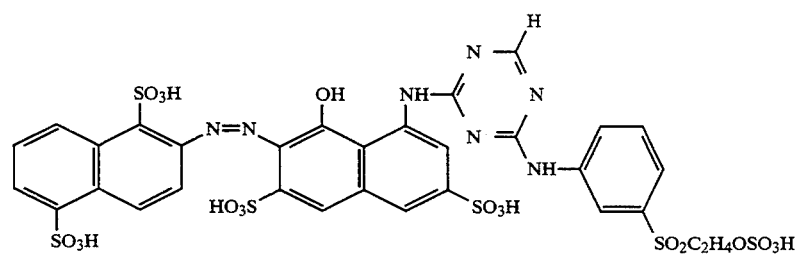

2N Sodium carbonate was added to a stirred suspension of 1-amino-8-hydroxynaphthalene-3,6-disulphonic acid (319 parts) in water (1000 parts) until a complete solution of approximately pH 6.0 was obtained. This solution was added dropwise to a stirred suspension obtained by gradual addition of a solution of 2,4-dichloro-s-triazine (161 parts) in acetone (800 parts by volume) to ice-water (1000 parts) at 0°-5° C., the pH of the solution being allowed to fall to 3 and then maintained at this value by addition of 2N sodium carbonate. The resultant mixture was stirred for a further 1 hour at 0°-5° C. and pH 3 to give a coupling component solution.

To a stirred mixture of 2-aminonaphthalene-1,5-disulphonic acid (303 parts) in ice-water (7500 parts) at 0°-5° C. was added aqueous hydrochloric acid (34.5% strength, 500 parts by volume) followed by 2N sodium nitrite (500 parts by volume). The mixture was stirred for 1 hour at 0°-5° C. before destroying excess nitrous acid by addition of sulphamic acid. The resultant diazonium salt suspension was added to the above coupling component solution, the pH raised to 6.5 by addition of 1N sodium carbonate, and the mixture stirred at 0°-5° C. and pH 6.5-6.9 for a further 2 hours. The azo product was precipitated by addition of KCl isolated by filtration and dried to give a monochlorotriazinyl product.

The dry monochlorotriazinyl product (560 parts) and 3-aminophenyl-β-sulphatoethyl sulphone (232 parts) were condensed by stirring together in water (5500 parts) at 50° C. for 20 hours during which the pH of the solution was maintained at 6 to 6.5 by addition of 1N sodium carbonate as required. The product was isolated by the addition of KCl and the precipitate filtered off and dried to give the alkali metal salt of the title compound (lambda max 543 nm).

The title product was applied to cotton by exhaust dyeing.

EXAMPLE 5

Preparation of the compound of the formula

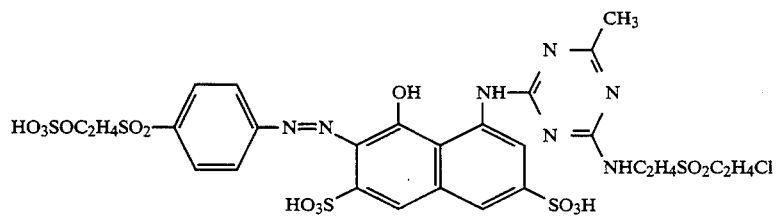

The method of Example 3 was followed except that in place of 3-aminophenyl-β-sulphatoethylsulphone there was used 2-aminoethyl-2′-chloroethylsulphone hydrochloride. The product was isolated by addition of KCl and the precipitate filtered off and dried to give the alkali metal salt of the title compound (lambda max 515 nm).

The title product was applied to cotton by exhaust dyeing.

EXAMPLE 6

Preparation of a compound of the formula

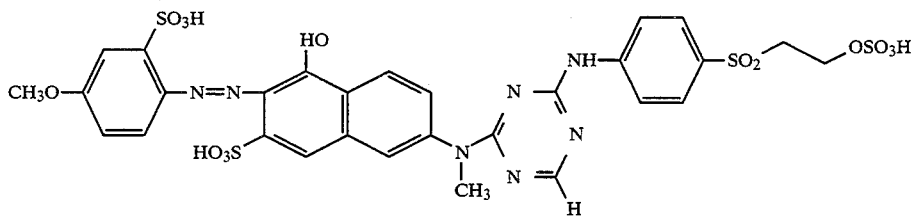

1M sodium carbonate was added to a stirred solution of 2-(N-methyl)-amino-5-hydroxy-6-(4'-methoxy-2'-sulpho)-azaphenylnaphthalene-7-sulphonic acid (9.3 g) (prepared by the reaction of the diazonium salt of 4-methoxy-2-sulphoaniline with 2-(N-methyl)-amino-5-hydroxynaphthalene-7-sulphonic acid)) in water (200 ml) until a solution of approximately pH 6.0 was obtained. To this solution was added dropwise over 15 minutes a solution of 2,4-dichloro-s-triazine (4.3 g) in acetone (30 ml) and the resulting mixture was stirred at room temperature for 2 hours.

4-Aminophenyl-β-sulphatoethylsulphone (7.1 g) was added portionwise over 20 minutes. The temperature was raised to 70° C. and the solution stirred for 16 hours, during which the pH was maintained at 6.1 using 1M sodium carbonate as required.

The reaction mixture was cooled to ambient temperature and the product precipitated by the addition of ethanol. The product was collected by filtration, washed with ethanol and dried to give the alkali metal salt of the title compound (lambda max 504 nm).

The title product was applied to cotton by exhaust dyeing.

EXAMPLE 7

Preparation of a compound of the formula

A solution of 1,3-diaminobenzene-4-sulphonic acid (9.4 g) in water (200 ml) was adjusted to pH 5 with 2M sodium hydroxide and cooled to 0°-5° C. A solution of 2,4-dichloro-s-triazine (9.4 g) in acetone (100 ml) was added dropwise over 5 minutes and the mixture stirred at 0°-5° C. for 1 hour. The reaction mixture was allowed to warm to ambient temperature and the product collected by filtration to give a coupling component.

To a stirred mixture of 4-aminophenyl-β-sulphatoethylsulphone (5.6 g) in ice-water (300 ml) at 0°-5° C. was added aqueous concentrated hydrochloric acid (11 ml) followed by 2M sodium nitrite (11 ml). The mixture was stirred for 30 minutes at 0°-5° C. before destroying excess nitrous acid with sulphamic acid. The resultant diazonium salt suspension was added to a solution of the above coupling component (6 g) in ice-water (100 ml) at pH 5. The pH was raised to 6 with sodium carbonate and the mixture stirred at 0°-5° for 2 hours. An azo product was precipitated with potassium acetate, isolated by filtration and dried. The dry azo product (7.3 g) and 3-amino-β-sulphatoethyl sulphone (2.5 g) were stirred in water (100 ml) at 50° C. for 18 hours, during which the pH was maintained at 6 to 7 by the addition of 1M sodium carbonate as required. The resultant mixture was cooled to ambient temperature and the product precipitated by dropwise addition of acetone, isolated by filtration and dried to give the alkali metal salt of the title compound (lambda max 377 nm).

The title product was applied to cotton by exhaust dyeing.

EXAMPLE 8

Preparation of a compound of the formula

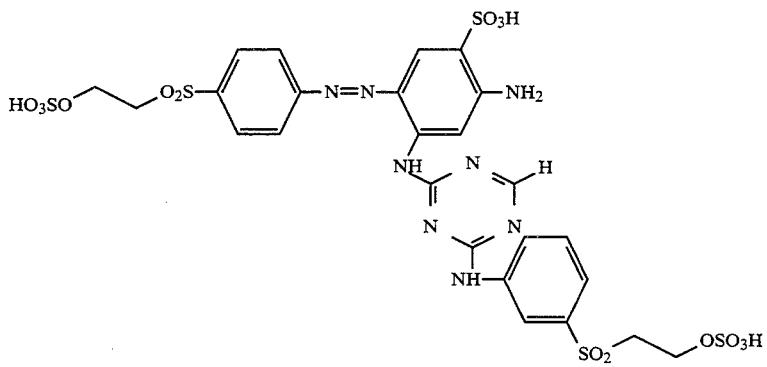

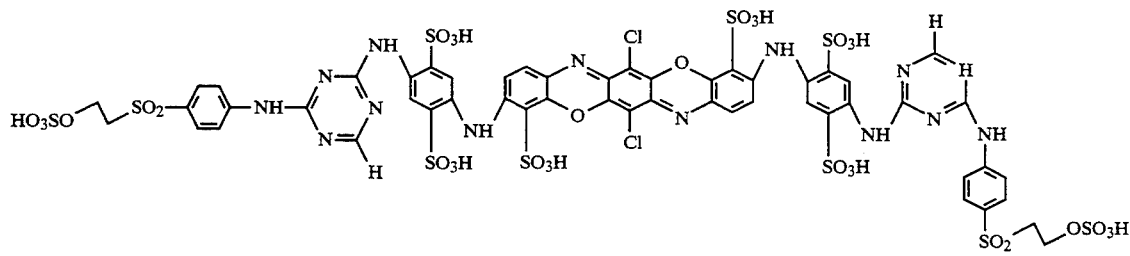

A neutral solution of 4,4'-diaminodiphenylamine-2,3'-disulphonic acid (72 g) (prepared from the condensation of 4-nitrochloro benzene-2-sulphonic acid with 1,4-phenylenediamine-2-sulphonic acid followed by reduction) and 2,3,5,6-tetrachlorobenzo-1,4-quinone (25 g) in water (500 ml) was stirred at 50° C. for 6 hours, keeping the pH at 6–7 by the addition of sodium hydroxide solution. The solution was cooled and salt (150 g) added. The precipitated product was collected by filtration, washed with 25% brine and dried.

The above dried product (30 g) was added to 20% oleum (300 ml) and the mixture was stirred at room temperature for 2 hours then added to ice-water (3000 ml). The resultant precipitate was filtered off, washed with saturated brine and dried to give a triphenodioxazine dyebase.

To a stirred solution of the above triphenodioxazine dyebase (21 g) in water (300 ml) was added a solution of 2,4-dichloro-s-triazine (10 g) in acetone (50 ml) dropwise over fifteen minutes. The mixture was stirred at room temperature for two hours and then 4-aminophenyl-β-sulphatoethylsulphone (14 g) was added over 20 minutes. The temperature was raised to 70° C. and the reaction mixture stirred for 16 hours maintaining the pH at 6 to 6.5 using 1M sodium carbonate as required.

The resultant mixture was allowed to cool to room temperature, the product was precipitated by addition of NaCl, collected by filtration and dried to give the alkali metal salt of the title compound (lambda max 631 nm).

The title product was applied to cotton by exhaust dyeing.

EXAMPLE 9

The method of Example 8 may be repeated except that in place of 2,4-dichloro-s-triazine there is used 2,4-dichloro-6-methyl-s-triazine.

EXAMPLE 10

The method of Example 8 may be repeated except that in place of 2,4-dichloro-s-triazine there is used 2,4-dichloro-6-ethyl-s-triazine.

EXAMPLE 11

Preparation of a compound of the formula

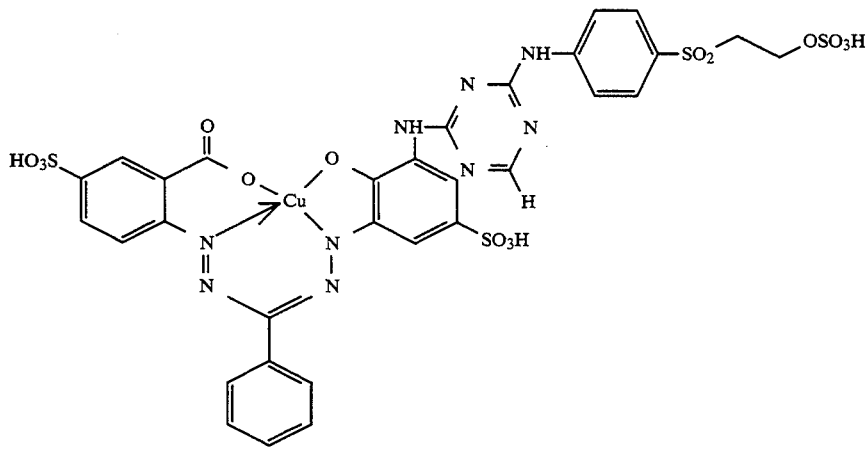

To a solution of the copper salt of N-(2-hydroxy-5-sulpho-3-aminophenyl)-N'-(2-carboxy-4'-sulphophenyl)-ms-phenyl formazan (11.9 g) (obtained by coupling diazotised 6-acetylamino-2-aminophenol-4-sulphonic acid with the hydrazone from benzaldehyde and 2-carboxyphenylhydrazine-4-sulphonic acid, coppering and hydrolysing the acetylamino group with dilute caustic soda) in water (400 ml) at pH 6 was added a solution of 2,4-dichloro-s-triazine (5.1 g) in acetone (50 ml). The mixture was stirred at room temperature for 1 hour, maintaining the pH at 6.5 using 2M sodium carbonate. The monochlorotriazinyl product was precipitated by salting with sodium chloride, collected by filtration and dried.

The above dry monochlorotriazinyl product (16 g) and 4-aminophenyl-β-sulphatoethyl sulphone (9.8 g) were stirred in water (200 ml) at 70° C. for 16 hours, during which the pH was maintained at 6.1 using 2M sodium carbonate. The resultant mixture was cooled to ambient temperature and the product precipitated by adding NaCl, collected by filtration and dried to give the alkali metal salt of the title compound (lambda max 616 nm).

The title product was applied to cotton by exhaust dyeing.

EXAMPLE 12

The method of Example 11 may be repeated except that in place of 4-aminophenyl-β-sulphatoethylsulphone there is used 3-aminophenyl-β-sulphatoethylsulphone.

EXAMPLE 13

The method of Example 11 may be repeated except that in place of 2,4-dichloro-s-triazine there is used 2,4-dichloro-6-methyl-s-triazine.

EXAMPLE 14

The method of Example 11 may be repeated except that in place of 2,4-dichloro-s-triazine there is used 2,4-dichloro-6-ethyl-s-triazine.

EXAMPLE 15

Preparation of a compound of the formula

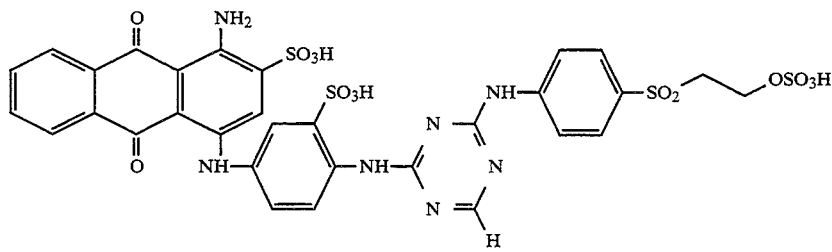

A mixture of 1-amino-4-bromoanthraquinone-2-sulphonic acid (12 g), 1,4-diaminobenzene-2-sulphonic acid (9.6 g) and sodium carbonate (10 g) in water (250 ml) was heated to 55° C. Copper sulphate (0.5 g) was added and the reaction mixture stirred for 2 hours at 55° C. The mixture was cooled to ambient temperature, precipitated by adding NaCl, collected by filtration and dried.

A solution of the above dry product (8.4 g) in water (200 ml) was stirred at room temperature as a solution of 2,4-dichloro-s-triazine (3.4 g) in acetone (50 ml) was added over 5 minutes, maintaining the pH at 6.1 with 2M sodium carbonate. The mixture was stirred for 2 hours and the product precipitated using NaCl. The product was collected by filtration, washed with 20% brine followed by acetone and dried to give a monochlorotriazinyl product.

The dry monochlorotriazinyl product (10 g) and 4-aminophenyl-β-sulphatoethyl sulphone (8.4 g) were stirred in water at 70° C. for 16 hours, maintaining the pH at 6.1 using 2M sodium carbonate as required. The resultant mixture was allowed to cool to room temperature and the product precipitated using NaCl, collected by filtration and dried to give the alkali metal salt of the title compound (lambda max 608 nm).

The title product was applied to cotton by exhaust dyeing.

EXAMPLE 16

The method of Example 15 may be repeated except that in place of 4-aminophenyl-β-sulphatoethylsulphone there is used 3-aminophenyl-βsulphatoethylsulphone.

EXAMPLE 17

The method of Example 15 may be repeated except that in place of 2,4-dichloro-s-triazine there is used 2,4-dichloro-6-methyl-s-triazine.

EXAMPLE 18

The method of Example 15 may be repeated except that in place of 2,4-dichloro-s-triazine there is used 2,4-dichloro-6-ethyl-s-triazine.

EXAMPLE 19

Preparation of a compound of the formula

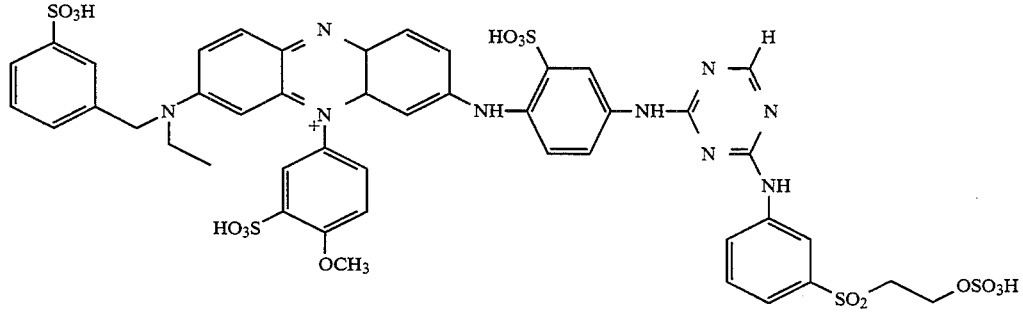

A solution of 4-amino-4'-nitrodiphenylamine-2'-sulphonic acid (15.45 g) and N-ethyl-N-phenyl-3-sulphobenzylamine (14.55 g) in water (250 ml) was stirred at pH 6-7 and 10° C. A solution of sodium dichromate dihydrate (10.2 g) and sulphonic acid (98% strength; 13 ml) in water (60 ml) was added rapidly and the mixture was stirred for 20 minutes at 10°-20° C. A solution of 4-methoxyaniline-3-sulphonic acid (10.15 g) in water (50 ml) at pH 7.0 and 15° C. was added, followed quickly by a solution of sodium dichromate dihydrate (9.9 g) in water (20 ml). The mixture was heated at 90°-95° C. for 20 minutes, cooled to 65° C. and adjusted to pH 5.5 using acetic acid. Powdered Iron (15 g) was added and the mixture was stirred at 65°-70° C. for 90 minutes.

The mixture was filtered at 70° C., the filtrate was made slightly alkaline to Brilliant Yellow by the addition of sodium carbonate and refiltered. The product was precipitated by adding NaCl, collected by filtration and dried to give an aminophenazine compound.

The dry aminophenazine compound (15.3 g) was dissolved in water (200 ml). A solution of 2,4-dichloro-s-triazine (6.0 g) in acetone (50 ml) was added dropwise over 5 minutes maintaining the pH at 6 using 2M sodium carbonate.

The resultant mixture was stirred for 60 minutes and was then heated to 70° C. 3-Aminophenyl-β-sulphatoethyl sulphone (7 g) was added portionwise over 15 minutes and the mixture was stirred for 16 hours at 70° C. and pH 6.1. The reaction mixture was allowed to cool to room temperature and the product precipitated by adding NACl, collected by filtration, washed with 10% brine, then with acetone and dried to give the alkali metal salt of the title compound (lambda max 575 nm).

The title product was applied to cotton by exhaust dyeing.

EXAMPLE 20

The method of Example 19 may be repeated except that in place of 3-aminophenyl-β-sulphatoethylsulphone there is used 4-aminophenyl-β-sulphatoethylsulphone.

EXAMPLE 21

The method of Example 19 may be repeated except that in place of 2,4-dichloro-s-triazine there is used 2,4-dichloro-6-methyl-s-triazine.

EXAMPLE 22

The method of Example 19 may be repeated except that in place of 2,4-dichloro-s-triazine there is used 2,4-dichloro-6-ethyl-s-triazine.

I claim:

1. A water-soluble reactive dye of the Formula (2):

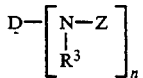

wherein:
each
Z independently is a reactive group of Formula (1):

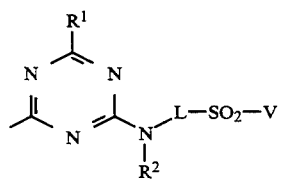

D is a chromophoric group;
each
$R^3$ independently is H or optionally substituted alkyl;
n is 1 or 2;
$R^1$ is $C_{1-4}$ alkyl;
$R^2$ is H or $C_{1-4}$ alkyl;

L is a divalent organic spacer group; and
V is vinyl or a group convertible to vinyl on treatment with aqueous alkali.

2. A dye according to claim 1 wherein L is an alkylene, arylene or aralkylene group.

3. A dye according to claim 1 wherein D is a chromophoric group of the azo, triphenodioxazine, anthraquinone, phthalocyanine or formazan series.

4. A dye according to claim 1 wherein D is a chromophoric group of the azo series.

5. A dye according to claim 1 wherein D is a chromophoric group of the triphenodioxazine series.

6. A dye according to claim 1 wherein L is alkylene, arylene or aralkylene.

7. A dye according to any one of claims 1, 2, 3, 5, or 6 which is free from halogen atoms.

8. A water-soluble reactive dye of the Formula (2):

wherein:
D is a chromophoric group of the triphenodioxazine, anthraquinone, phthalocycanine or formazan series;
each
$R^3$ independently is H or optionally substituted alkyl;
n is 1 or 2; and
each
Z independently is of the formula:

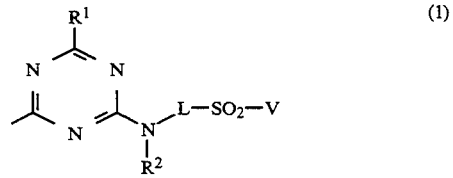

wherein:
$R^1$ is H or $C_{1-4}$-alkyl;
$R^2$ is H or $C_{1-4}$-alkyl;
L is a divalent organic spacer group; and
V is a vinyl or a group convertible to vinyl on treatment with aqueous alkali.

9. A dye according to claim 8, wherein $R^1$ is H.

10. A dye according to claim 8, wherein $R^1$ is $C_{1-4}$-alkyl.

11. A dye according to claim 8, wherein D is a chromophoric group of the tripherodioxazine series.

12. A dye according to claim 8, wherein D is a chromophoric group of the anthraquinone series.

13. A dye according to claim 8, wherein D is a chromophoric group of the phthalocyanine series.

14. A dye according to claim 8, wherein D is a chromophoric group of the formazan series.

15. A process for the coloration of a textile material comprising applying thereto a dye according to claim 1.

16. A textile material coloured using a dye according to claim 1.

* * * * *